United States Patent [19]
Lewchenko et al.

[11] Patent Number: 6,058,595
[45] Date of Patent: May 9, 2000

[54] ARMATURE MANUFACTURING METHOD

[75] Inventors: Nicholas A. Lewchenko, Beavercreek; E. Wayne Zicht, Huber Heights, both of Ohio

[73] Assignee: Globe Products Inc., Huber Heights, Ohio

[21] Appl. No.: 09/179,122

[22] Filed: Oct. 26, 1998

Related U.S. Application Data

[62] Division of application No. 08/634,162, Apr. 18, 1996, Pat. No. 5,855,058.

[51] Int. Cl.$^7$ ..................................................... H02K 15/09
[52] U.S. Cl. ............................................. 29/597; 29/564.6
[58] Field of Search .............................. 29/597, 598, 596, 29/732, 735, 736, 564.6

[56] References Cited

U.S. PATENT DOCUMENTS

| | | |
|---|---|---|
| 3,673,878 | 7/1972 | Biddison . |
| 3,713,209 | 1/1973 | Biddison . |
| 3,713,598 | 1/1973 | Bucholtz et al. . |
| 3,785,034 | 1/1974 | Bucholtz . |
| 3,812,577 | 5/1974 | Compton et al. . |
| 3,857,172 | 12/1974 | George et al. . |
| 3,921,284 | 11/1975 | Bucholtz et al. . |
| 3,927,456 | 12/1975 | Dammar . |
| 3,927,843 | 12/1975 | Dammar . |
| 4,289,281 | 9/1981 | George et al. . |
| 4,633,577 | 1/1987 | Banner . |
| 4,765,551 | 8/1988 | Page et al. . |
| 4,826,092 | 5/1989 | Tsugawa . |
| 4,827,601 | 5/1989 | Banner . |
| 4,951,379 | 8/1990 | Clemenz . |
| 4,974,313 | 12/1990 | Reiger, Jr. . |
| 5,090,107 | 2/1992 | Beakes et al. . |
| 5,090,108 | 2/1992 | Banner et al. . |
| 5,187,856 | 2/1993 | Corey et al. . |
| 5,379,511 | 1/1995 | Corey et al. . |

*Primary Examiner*—Carl E. Hall
*Attorney, Agent, or Firm*—Roger S. Dybvig

[57] ABSTRACT

Armature start and finish wires are trimmed after connection to their associated commutator tang by use of a knife edge carried by an otherwise conventional lead guide mechanism. The lead guide mechanism moves the knife edge into position against the coil lead, and the coil lead is drawn across the knife edge by pivotal movement of a wire gripper holding the lead. The knife edge preferably comprises a blade removably secured to a portion of the lead guide mechanism, but the knife edge may alternatively be formed, by machining for example, on a part of the lead guide mechanism itself.

4 Claims, 3 Drawing Sheets

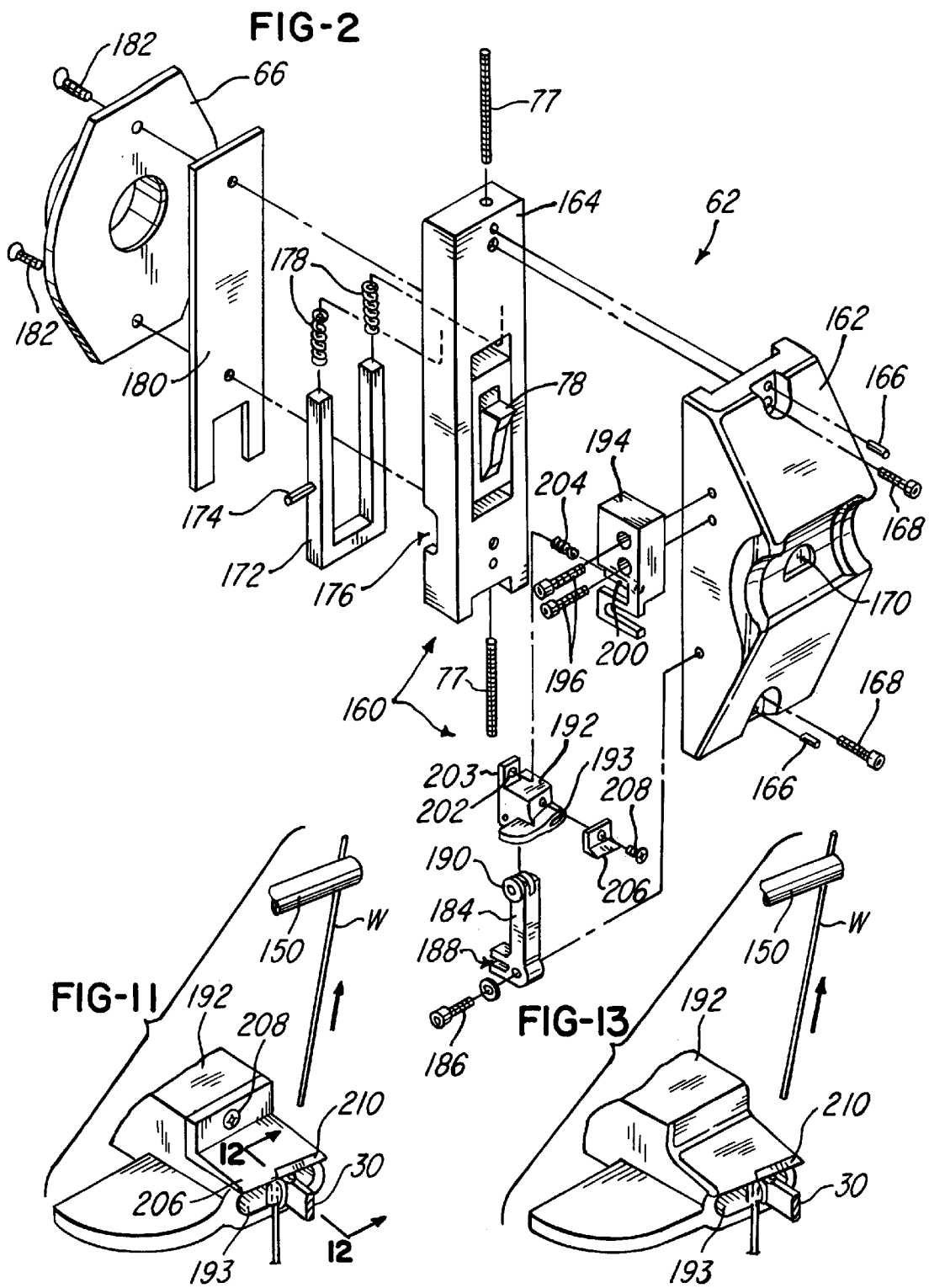

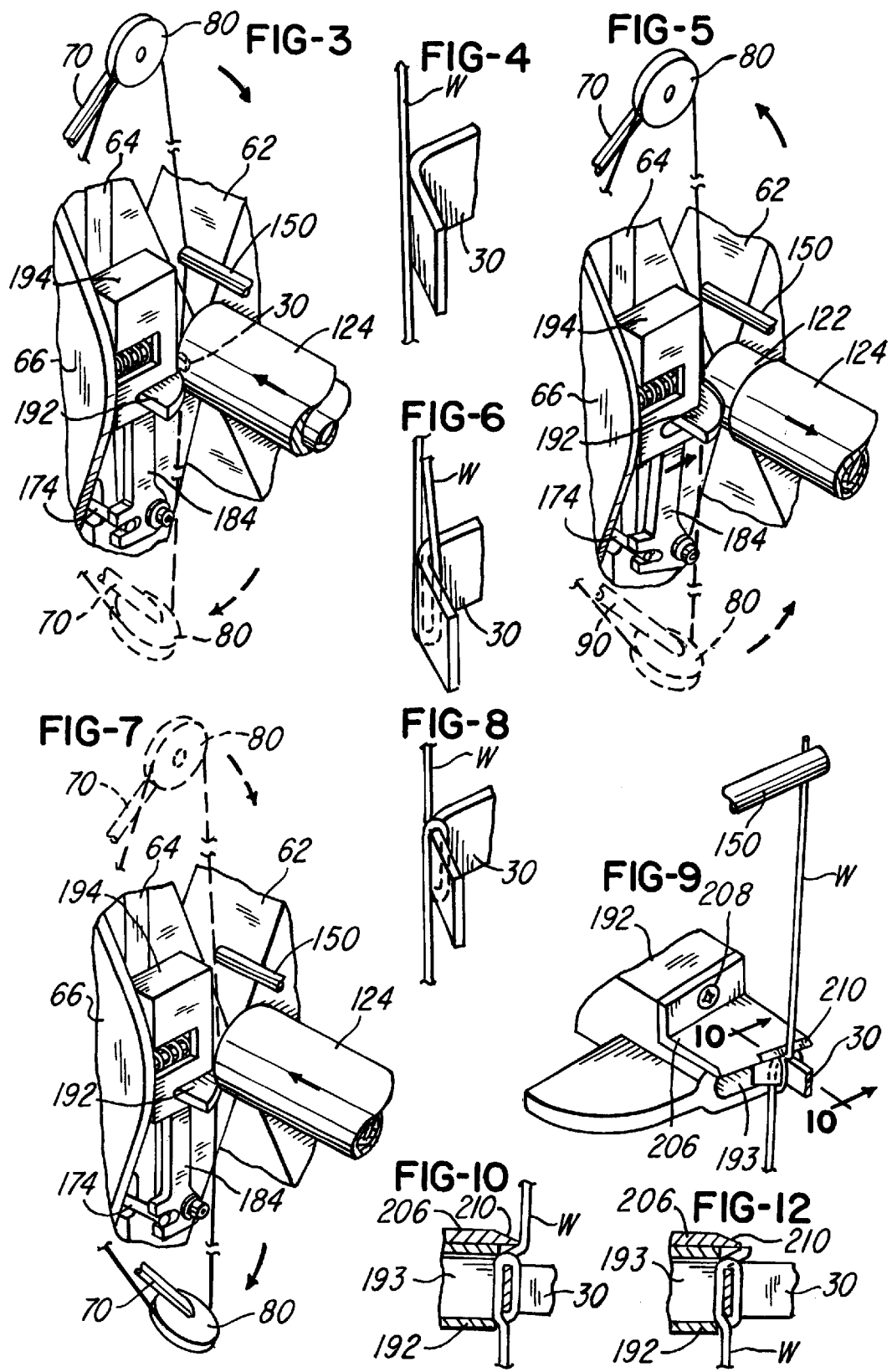

ARMATURE MANUFACTURING METHOD

CROSS REFERENCE TO RELATED APPLICATIONS

This is a division of application Ser. No. 08/634,162, filed Apr. 18, 1996 now U.S. Pat. No. 5,855,058.

FIELD OF THE INVENTION

This invention relates to an armature manufacturing method and apparatus and especially to the severing of lead wires of armatures wound by an automatic double flier winding machine. As will become apparent, the invention is equally applicable to single flier winding machines.

INCORPORATION BY REFERENCE

The disclosures of U.S. Pat. No. 4,633,577, issued to Alvin C. Banner on Jan. 6, 1987, U.S. Pat. No. 4,765,551, issued to Teddy L. Page and Alvin C. Banner on Aug. 23, 1988, and U.S. Pat. No. 5,379,511, issued to Nathan A. Corey, Carl L. Clark, and Patrick A. Dolgas on Jan. 10, 1995, are hereby incorporated by reference herein.

BACKGROUND OF THE INVENTION

The present invention is intended for use in the manufacture of armatures of the type having an armature core and a commutator mounted in spaced relation on an armature shaft and wherein the commutator is provided with coil lead-receiving hooks or tangs. As used herein, the term "start wires" refers to the wire segments (also called "coil leads") leading to the first coils wound by the fliers. The term "finish wires" refers to the wire segments or coil leads extending from the last coils wound. In double flier armature winding machines having two fliers, there are two start and two finish wires.

Flier-type armature winding machines commonly have a commutator shield assembly including an inner shield and an outer shield. The inner shield is notched to expose a pair of commutator tangs to enable lead wires to be connected to them. When coils are being wound by the fliers, the outer shield covers the commutator tangs exposed through the inner shield notches to prevent the wire segments extending from the fliers from engaging the aforementioned commutator tangs. The outer shield is retracted from the path of the wire segments when the lead wire connections between the coil leads and the commutator tangs are to be made, as by reverse and forward movements of the fliers. Thus, coil lead connections to the tangs can be made by manipulation of the outer shield and the fliers.

In a typical process for winding an armature, the end of a wire segment extending from a flier is held by a wire gripper or clamp and the wire segment is looped around a commutator tang, after which the short strand of wire between the tang and the wire gripper is severed as close to the tang as possible. Coil lead connections between subsequently wound coils are made between the finish of the winding of one coil and the start of the winding of the next coil. A finish wire extending from the last coil to be wound by each flier is looped about the appropriate tang, the wire segment extending from that tang to the flier is clamped by the wire gripper or clamp, and the wire severed as closely as possible to the same tang. In a double flier armature winder, the foregoing process is carried out simultaneously by both fliers using duplicate sets of wire grippers and duplicate sets of wire cutters.

U.S. Pat. No. 3,812,577, granted to Jerry L. Compton and David R. Seitz on May 28, 1974, discloses an approach to the severing of the coil lead wires from an armature while it is located in a winding machine wherein either one or both of the start and finish wires are severed by relative movement of the wire clamps gripping the wires and the armature. As a result of such relative movement, the wires are stressed at the tangs and severed at or quite near the edges of the tangs. Accordingly, there is little excess wire left extending from the tangs and further trimming operations are unnecessary.

The approach disclosed in said Compton et al. '577 patent is frequently used, especially for relatively fine wire applications wherein there is a relatively high probability that the wire will break at the edge of the tang. There are circumstances in which start wires connected to tangs in accordance with the teachings of said Compton et al. '577 patent may be pulled off the tangs when the fliers commence rotation to wind the first coils. This problem may be cured in many cases by looping each start wire two times around its associated tang in the manner described in U.S. Pat. No. 3,713,208, granted to James N. Doyle on Jan. 30, 1973. However, it is not always desirable to employ the methods of said Doyle '308 patent due to the geometry of the commutator tangs. For example, a tang may be so configured that the additional start wire loop has an adverse effect upon the connection of the finish wire or upon the subsequent processing of the armature, such as the usual hot-staking or fusing of the tangs and the wire loops. Occasionally, wires severed from tangs in accordance with said Compton et al. '577 patent break at locations between the tangs and the wire clamps in which event the excess wire lengths must be manually trimmed. This can present a costly and difficult manufacturing problem when using modern high speed production equipment. In other cases, especially with relatively heavy wire, tangs may be bent when the clamps are moved to sever the wires.

A method and apparatus proposed to address the problems discussed above is disclosed in U.S. Pat. No. 4,633,577, issued to Alvin C. Banner on Jan. 6, 1987. With the mechanism shown in the Banner '577 patent, a pair of wire trimming members having sharp edges that may be located close to a pair of diametrically opposed tangs are provided, each of which is supported by an arm pivotally mounted on a part fixed in relation to the inner shield. A driving connection in the form of a pin and a cam slot is provided between each arm and the outer shield whereby each arm is caused to pivot in response to movements of the outer shield. Wire clamps that grip the wires are moved away from the trimming members whereupon the wires are pulled against and severed at the trimming edges because of the high stress concentration experienced by the wires at that point. The concept of breaking lead wires across the edges of trimming members is employed by the apparatus of this invention, and the Banner U.S. Pat. No. 4,633,577 is incorporated by reference herein.

The mechanism shown in the Banner '577 patent has not proved to be satisfactory because it is difficult to adjust and maintain in adjustment in addition to being relatively complex and space-consuming. Moreover, there is a tendency for the wires to be scraped or torn by the trimming edges rather than to be cleanly broken.

U.S. Pat. No. 5,379,511, issued to Nathan A. Corey, Carl L. Clark, and Patrick A. Dolgas on Jan. 10, 1995, discloses a method and an apparatus that overcomes the deficiencies noted above with regard to the Banner '577 patent. The Corey et al. U.S. Pat. No. 5,379,511, which is incorporated by reference herein, discloses severing a start or finish wire closely adjacent its associated commutator tang by positioning a wire trimming blade closely adjacent to the outer periphery of the inner shield and substantially parallel to the longitudinal axis of an armature in the winding station. The trimming blade is mounted on a mounting bracket for pivotal or rocking movement about a pivot axis extending transversely through the blade and intermediate its ends. At its forward end, the trimming blade has a sharp end edge termed a "trimming edge".

When the outer shield is retracted to expose a pair of tangs, the trimming blade shown in the Corey et al. '511 patent is pivoted, by engagement therewith of a cam bearing member on the outer shield, into a position in which its forward end extends through a blade-receiving notch in the forward end of the inner shield and its wire trimming edge is located in a wire-severing position at or closely adjacent to a commutator tang and closer to the armature shaft than the outermost surfaces of the tangs. This locates the trimming blade so that a start or finish wire can be pulled over a portion of a trimming edge and severed closely adjacent the tang about which the start or finish wire is looped or hooked. The actual severing of a wire lead is accomplished by pulling the wire segment leading to the wire clamp or gripper against the sharp trimming edge by moving the wire gripper away from the armature core.

Severing coil leads in accordance with the Corey et al. '511 patent as well as severing coil leads in accordance with the other aforementioned methods and apparatus severs the wire sufficiently close to the tang for many applications. However, other applications require still closer start and finish wire trimming to produce acceptable parts.

SUMMARY OF THE INVENTION

An object of this invention is to provide a method and an apparatus wherein armature start and finish wires are reliably trimmed closely adjacent their associated commutator tangs. A related object is to provide a method and an apparatus wherein such close trimming is accomplished with little modification to existing winding machines.

In accordance with this invention, start and finish wires are trimmed using a sharpened edge carried by an otherwise conventional lead guide mechanism, such as disclosed in U.S. Pat. No. 4,765,551, issued to Teddy L. Page and Alvin C. Banner on Aug. 23, 1988. As well known, such lead guide mechanisms are used to assist in looping coil leads around commutator tangs. With the outer shield retracted and the lead guide mechanism actuated to cover the start tang, the strand of wire held by the wire gripper and connected to the start tang is drawn against the sharpened edge carried by the lead guide mechanism, by pivotal movement of the wire gripper, to sever the strand of wire as close as possible to the start tang.

The sharpened edge carried by the lead guide mechanism may be either a removable wire trimming blade or a sharpened edge formed on a part of the lead guide mechanism itself.

The foregoing and other objects and advantages will become apparent from the following description taken in conjunction with the accompanying drawings.

BRIEF DESCRIPTION OF THE DRAWINGS

FIG. 2 is an exploded perspective view of a winding form assembly and a lead guide mechanism modified in accordance with this invention.

FIG. 3 is a fragmentary perspective view of the armature winding machine of FIG. 1 showing the first stage in the process of connecting a start wire to a commutator tang.

FIG. 4 is an enlarged, fragmentary perspective view of the start wire and the commutator tang at the same stage illustrated in FIG. 3.

FIG. 5 is a fragmentary perspective view similar to FIG. 3 but showing a later stage in the connection process.

FIG. 6 is an enlarged, fragmentary perspective view similar to FIG. 4 but showing the later stage in the connection process illustrated in FIG. 5.

FIG. 7 is a fragmentary perspective view similar to FIG. 5 but showing a still later stage in the connection process.

FIG. 8 is an enlarged, fragmentary perspective view similar to FIG. 6 but showing the still later stage in the connection process illustrated in FIG. 7.

FIG. 9 is a close-up perspective view of a portion of the lead guide mechanism of FIG. 2.

FIG. 10 is a fragmentary sectional view taken along line 10—10 of FIG. 9.

FIG. 11 is a close-up perspective view similar to FIG. 9 illustrating a start wire being severed.

FIG. 12 is a fragmentary sectional view taken along line 12—12 of FIG. 11.

FIG. 13 is a close-up perspective view similar to FIG. 11 showing a second embodiment of this invention.

DETAILED DESCRIPTION

Figure 1:
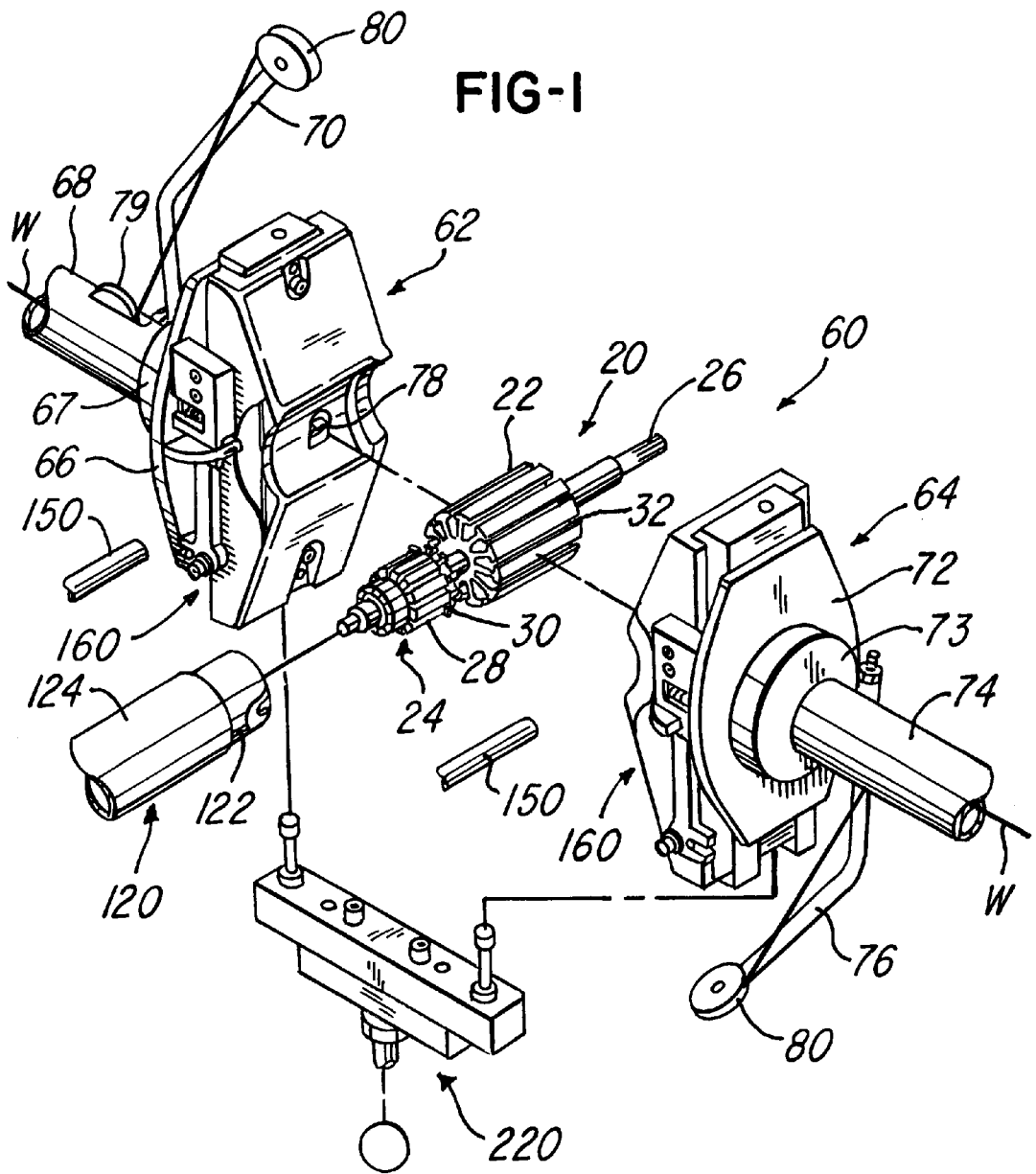
FIG. 1 is a fragmentary, partially diagrammatic perspective view of an armature winding machine in accordance with this invention.

With reference to FIG. 1, this invention is directed to an improved method and apparatus for winding the type of armature, generally designated 20, having a laminated core 22 and a commutator 24 mounted on an armature shaft 26. The commutator 24 has a plurality of circumferentially spaced commutator segments 28 terminating in tangs 30 adjacent one end of the laminated core 22. The core 22 has a plurality of radially extending, outwardly opening, coil-receiving slots 32 which receive coil windings (not shown). As well known, the coil windings are wound from insulated wire and are completely isolated from the armature core 22 and the shaft 26 by plural insulating members which need not be described herein.

An armature winding machine in accordance with this invention is generally designated 60 and includes left and right side chucks or winding form assemblies, designated 62 and 64 respectively, that receive the armature 20 between confronting, concavely curved surfaces thereof. The left side winding form assembly 62 is mounted upon a mounting plate 66 mounted by a bearing (not shown) in a bearing housing 67 that rotatably receives a flier spindle 68 on which is affixed a left side flier 70. The right side winding form assembly 64 is similarly mounted upon a mounting plate 72 mounted by a bearing (not shown) in a bearing housing 73 that rotatably receives a flier spindle 74 for a right side flier 76. The left side winding form assembly 62 and the right side winding form assembly 64 may be substantial mirror images, except that the left side winding form assembly 62, as viewed in FIG. 1, includes a conventional stop dog 78 against which the armature 20 is indexed. As also conventional, the position of the stop dog 78 may be adjustably fixed by means of opposing set screws 77.

As conventional, wire W is dereeled under tension from a supply spool (not shown) and coursed through the left side spindle 68 around a spindle exit pulley 79 mounted for rotation thereon and a flier pulley 80 mounted for rotation at the terminal end of the left side flier 70. Another strand of wire W is drawn under tension from another supply spool (not shown) through the right side spindle 74 and around a spindle exit pulley (not shown) and a right side flier pulley 80. As well known to those skilled in the art, the spindles 68 and 74 and, accordingly, the fliers 70 and 76, are simultaneously rotatably driven by a spindle drive motor or motors (not shown) for winding coils two at a time in spaced pairs of coil-receiving slots 32.

During the winding of coils onto the armature core 22, the end of the armature shaft 26 adjacent to the commutator 24 is gripped by a collet (not shown), the construction and operation of which may be entirely conventional and form no part of this invention. A description of one type of collet mechanism and its operation is contained in said Banner U.S. Pat. No. 4,633,577.

In preparation for winding the coils and during the winding cycle, the armature must be rotated as necessary to properly align its coil-receiving slots with the winding form assemblies 62 and 64 and to enable appropriate connections to the commutator tangs to be made. Various forms of armature rotator devices may be used for this purpose and the details of the construction and operation thereof form no part of this invention. One such rotator device is shown for example in the U.S. Pat. No. 3,673,878 issued to John M. Biddison on Jul. 4, 1972. (The Biddison patent also discloses a collet assembly that could be used in lieu of that described in the Banner '577 patent.)

A preferred form of an armature rotator device is illustrated in the Corey et. al. '511 patent along with a commutator shield assembly, generally designated 120 both herein and in the Corey et al. '511 patent. The illustrated commutator shield assembly 120 includes an inner shield 122 and an outer shield 124 which permit a pair of diametrically-opposed commutator tangs 30 to be selectively exposed so that coil leads may be connected thereto. Of course, shield assemblies having other configurations may also be used.

The armature winding machine 60 of this invention is also provided with a pair of wire clamps or grippers 150 for gripping the wire segments leading to the fliers at the beginning and the end of the winding of each armature. Each wire gripper 150 may be substantially as described in the Corey et al. '511 patent and is not described in further detail herein.

With reference to FIGS. 1 and 2, each of the winding form assemblies 62 and 64 includes a lead guide mechanism, generally designated 160, which is used to assist in guiding wire leads into the bights of their associated tangs 30 when connecting start and finish wires to commutator tangs 30 and, in some applications when connecting coil leads between successively wound coils. FIG. 2 illustrates the construction of the left side winding form assembly 62 and its lead guide mechanism 160. The winding form assembly 62 and the lead guide mechanism 160 illustrated herein operate using the same principles as the lead guide mechanism disclosed in U.S. Pat. No. 4,765,551, issued to Teddy L. Page and Alvin C. Banner on Aug. 23, 1988, which is incorporated by reference herein. The operation and construction of the lead guide mechanism 160 illustrated herein will be apparent to one skilled in the art from the Page et al. '551 patent.

With continued reference to FIG. 2, the winding form assembly 62 comprises a winding form body 162 having highly polished surfaces over which insulated magnet wire is coursed into slots 32 in the armature core 22 to form armature coils (not shown). A receiver block 164, connected to the mounting plate 66 by a pair of screws 182, is secured to the backside of the body 162 by a pair of pins 166 and a pair of screws 168. The illustrated receiver block 164 includes the stop dog 78 mentioned above, which projects through an aperture 170 in the winding form body 162.

A U-shaped lead guide actuator 172 is slidably disposed in a rearwardly opening cavity in the receiver block 164 and a drive pin 174 carried by the lead guide actuator 172 projects laterally through a notch 176 in the receiver block 164. A pair of springs 178 biases the lead guide actuator 172 downwardly within the receiver block 164. A backing plate 180, between the mounting plate 66 and the receiver block 164, covers the cavity in the receiver block 164 and is aligned with the receiver block 164 by the screws 182.

A wire guide finger 184 is pivotably mounted to the side of the winding form body 162 by a screw 186 acting as a pivot pin. The wire guide finger 184 has a slot 188 which slidably receives the drive pin 174. The wire guide finger 184 also has a roller 190 at its upper end, and a lead guide member 192 having a tang-receiving pocket 193 formed therein rides upon the roller 190. A retainer 194 covers the lead guide member 192 and is secured to the side of the winding form body 162 by a pair of screws 196. As is well known, the retainer 194 confines the lead guide member 192 to linear movement when the wire guide finger 184 is pivoted by movement of the lead guide actuator 172 and the drive pin 174 projecting therefrom. To this end, the retainer 194 includes a guide pin 200 which is received in an aperture 202 in an upstanding flange 203 on lead guide member 192. A spring 204 is provided around the pin 200 to bias the lead guide member 192 towards its retracted position shown in FIG. 1.

With reference to FIGS. 9 through 12, the start and finish wires that have been connected to commutator tangs 30 may be trimmed or severed closely adjacent to their associated tangs 30 in accordance with this invention by use of a sharpened edge on the lead guide member 192. The lead guide member 192 preferably carries a wire trimming blade 206 that is attached thereto by a screw 208, the blade 206 providing a knife edge 210 that projects slightly beyond the margin of the lead guide member 192, as best shown in FIGS. 10 and 12.

FIGS. 3 through 8 illustrate the typical connection of a start wire to a commutator tang 30. At the end of winding of the previously wound armature 20, the flier 70 is in a position termed a "reverse stop" position, as shown in full lines in FIG. 3. After the next armature 20 to be wound is placed into the collet mechanism (not shown), the outer shield 124 is advanced so that no commutator tangs 30 are exposed, and the flier 70 is advanced to a "forward stop" position, as shown in broken lines in FIG. 3. As a result of the flier motion, the strand of wire extending from the flier 70 to the wire gripper 150 follows a path behind the tang 30, as viewed in FIG. 4, i.e. between the commutator 24 and the core 22 (FIG. 1).

Thereafter, the outer shield 124 is retracted, and the lead guide mechanism 160 is actuated to advance the lead guide member 192 toward the commutator 24, thereby covering the tang 30, as shown in FIG. 5. The flier 70 is then reversely rotated back to the reverse stop position shown in full lines in FIG. 5. The flier motion, in conjunction with the lead guide member 192, causes the wire to be cammed or guided into the bight of the tang 30, as shown in FIG. 6.

With reference to FIG. 7, the lead guide member 192 is then withdrawn from its position covering the tang 30, and the outer shield 124 is advanced to again cover the tang 30.

Thereafter, the flier 70 is advanced to the forward stop position shown in full lines in FIG. 7. As a result, the wire is looped around the tang 30 as shown in FIG. 8.

In accordance with this invention and with reference to FIGS. 9 through 12, the outer shield 124 is again retracted to expose the tang 30. The lead guide mechanism 160 is then operated so that the lead guide member 192 is advanced inwardly toward the commutator 24 so that the strand of wire leading from the tang 30 to the wire gripper 150 is lightly engaged by the knife edge 210 of the blade 206, thereby making a small kink or bend in the wire as shown in FIGS. 9 and 10. The wire gripper 150 is then pivoted upwardly, as illustrated in FIG. 11, to draw the strand of wire against the knife edge 210, thereby severing the wire against the knife edge 210 at the point of engagement between the wire and the knife edge 210 due to the concentrated stress at that point. After the wire is severed, the armature 20 may be indexed to a wind position and coils (not shown) may be wound into the slots 32 in the armature core 22 in a well known manner.

A finish wire may be severed or trimmed in a similar manner. However, certain additional steps must be carried out in order to trim a finish wire. Before severing the finish wire, the armature 20 must first be rotated to a position where the wire gripper 150 may grip the finish wire. This typically consists of rotating the armature 20 until the finish tang 30 is at the "six o'clock" or "12 o'clock" position, depending on which finish wire in a double flier winder is to be gripped by the wire gripper 150. After the finish wire is gripped by the wire gripper 150, the armature 20 is then reversely rotated back to its original position so that the lead guide member 192 can be advanced into position to cover the finish tang 30, thereby locating the blade 206 against the finish wire. The finish wire is then severed in accordance with this invention by the upward pivoting of the wire gripper 150 to draw the wire against the knife edge 210, as described above with regard to the start wire.

It is contemplated that the finish wire may be trimmed by other methods, such as those described above or as disclosed in U.S. Pat. No. 4,827,601, issued to Alvin C. Banner on May 9, 1989.

FIG. 13 illustrates an alternate embodiment of the lead guide member 192 and the knife edge 210. In FIG. 13, the knife edge 210 is integrally formed on the lead guide member 192, instead of being provided by a removable blade 206. The integral knife edge 210 may be formed on the lead guide member 192 in any suitable manner, but it is contemplated that the knife edge 210 will be machined as part of the lead guide member 192. Of course, one skilled in the art will recognize that the lead guide member 192 must be formed from a hardened material in the second embodiment to protect the knife edge 210 from being damaged as it severs the wire. Other than the manner in which the knife edge 210 of the second embodiment is provided, the second embodiment of this invention functions in a manner identical to that described above with regard to the preferred embodiment. However, the preferred embodiment of FIG. 9 does provide an advantage when compared to the embodiment of FIG. 13 in that the knife edge 210 may be readily replaced if it becomes dull or is otherwise damaged.

With reference to FIGS. 9 and 13, the surface of the lead guide member 192 facing the commutator 24 and the tang 30 and the aligned margin of the wire trimming blade 206 are angled outwardly from back to front as viewed in FIGS. 9 and 13 so that the coil lead wire will be cammed into the bight of the tang 30 when the wire is being looped thereabout. In addition, the knife edge 210 preferably extends across only a portion of the wire trimming blade 206 to prevent damage to the coil leads as they are cammed into the bight of their associated tang 30 by the lead guide member 192. A full extension of the knife edge 210 could lead to nicks or other damage to the coil lead as it is being cammed into the bight of the tang 30.

Although this invention is illustrated with lead guide mechanisms 160 utilizing an air actuator or other suitable drive mechanism, illustrated partially diagrammatically at 220 (FIG. 1), to drive the lead guide mechanism 160, such construction is merely illustrative of one manner in which lead guide mechanisms may be operated. Wire trimming in accordance with this invention may also be performed using other lead guide mechanisms, such as the mechanisms shown in U.S. Pat. No. 4,289,281, issued to Robert D. George and Robert C. Gray on Sep. 15, 1981, and U.S. Pat. No. 4,974,313, issued to Arthur C. Reiger, Jr. on Dec. 4, 1990. It will also be understood that this invention may be used with winding form assemblies having configurations other than the configuration illustrated herein.

The foregoing description is directed particularly to the left side winding form assembly 62 and its lead guide mechanism 160. The right side winding form assembly 64 and its lead guide mechanism 160 may be constructed in substantially the same manner. However, it will be recognized that the knife edge 210 for the right side lead guide mechanism 160 will be located on the opposite side of the commutator tang 30 when compared to the knife edge 210 of the left side lead guide mechanism 160.

The foregoing trimming method and apparatus may be used with a variety of wire sizes. However, it has been determined that the method and apparatus of this invention is most suited for use with 18 gauge or smaller gauge wires.

Although the presently preferred embodiments of this invention have been described, it will be understood that within the purview of the invention various changes may be made within the scope of the following claims.

Having thus described our invention, we claim:

1. A method for trimming an armature coil lead wire which has been connected to a tang of a commutator, comprising:

provide a lead guide mechanism having a lead guide member movable with respect to said commutator and further having a knife edge facing said commutator;

advancing said lead guide member toward said commutator until said knife edge engages the lead wire to be trimmed; and drawing said lead wire against said knife edge to thereby sever said lead wire closely adjacent said tang.

2. The method of claim 1 wherein said step of drawing said lead wire against said knife edge comprises gripping said lead wire with a wire gripper and then moving said wire gripper with respect to said lead guide member.

3. A method for manufacturing an electric motor armature comprising a slotted core and a commutator having a plurality of tangs, said method comprising the steps of:

locating an unwound armature in a winding machine having at least one winding form assembly located adjacent the core of said armature for guiding coils of wire into selected slots of said armature core and at least one lead guide mechanism for use in connecting armature coil lead wires to tangs on the commutator of said armature, said lead guide mechanism comprising a wire-guiding lead guide member mounted on said winding form and movable with respect to the commutator of said armature, said lead guide member further having a knife edge facing said commutator;

winding at least one coil of wire into a pair of slots in the core of said armature, said coil having a wire lead that is connected to a tang on the commutator of said armature;

advancing said lead guide member toward said commutator until said knife edge engages said wire lead; and drawing said lead wire against said knife edge to thereby sever said lead wire closely adjacent said tang.

4. The method of claim 3 wherein said step of drawing said lead wire against said knife edge comprises gripping said lead wire with a wire gripper and then moving said wire gripper with respect to said lead guide member.

* * * * *